R. H. ROSENBERG.
DRIVING MECHANISM FOR AUTOMOBILES.
APPLICATION FILED FEB. 14, 1912. RENEWED JUNE 15, 1917.

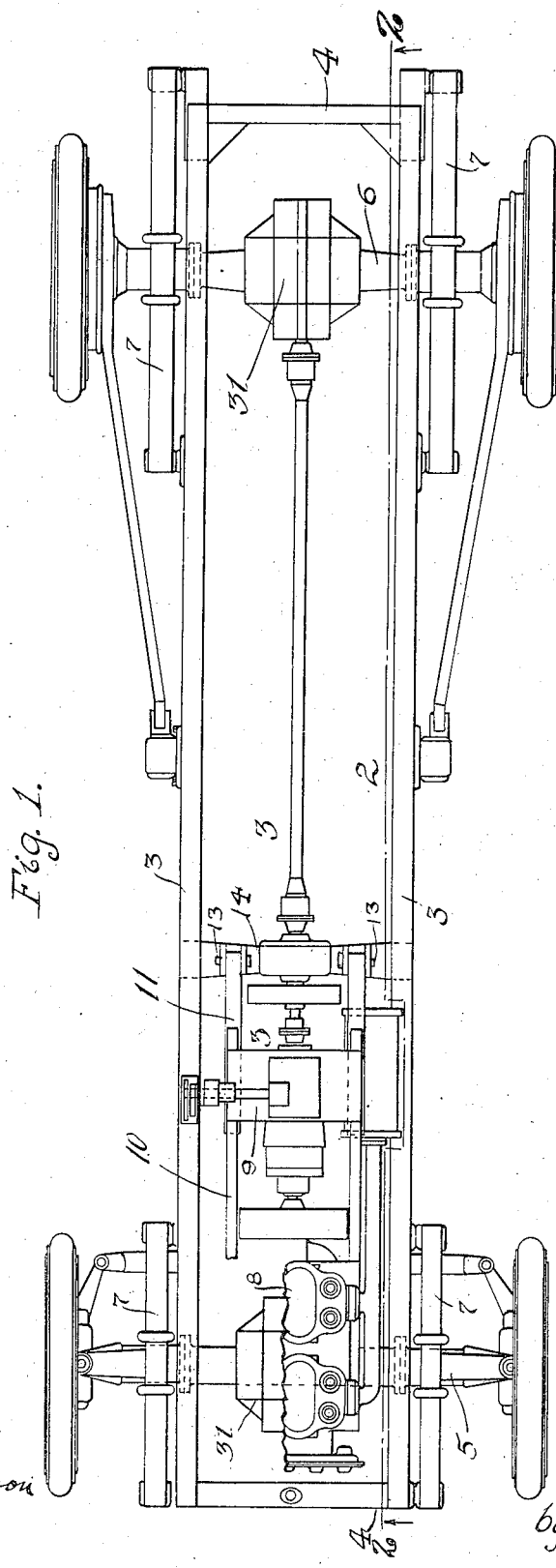

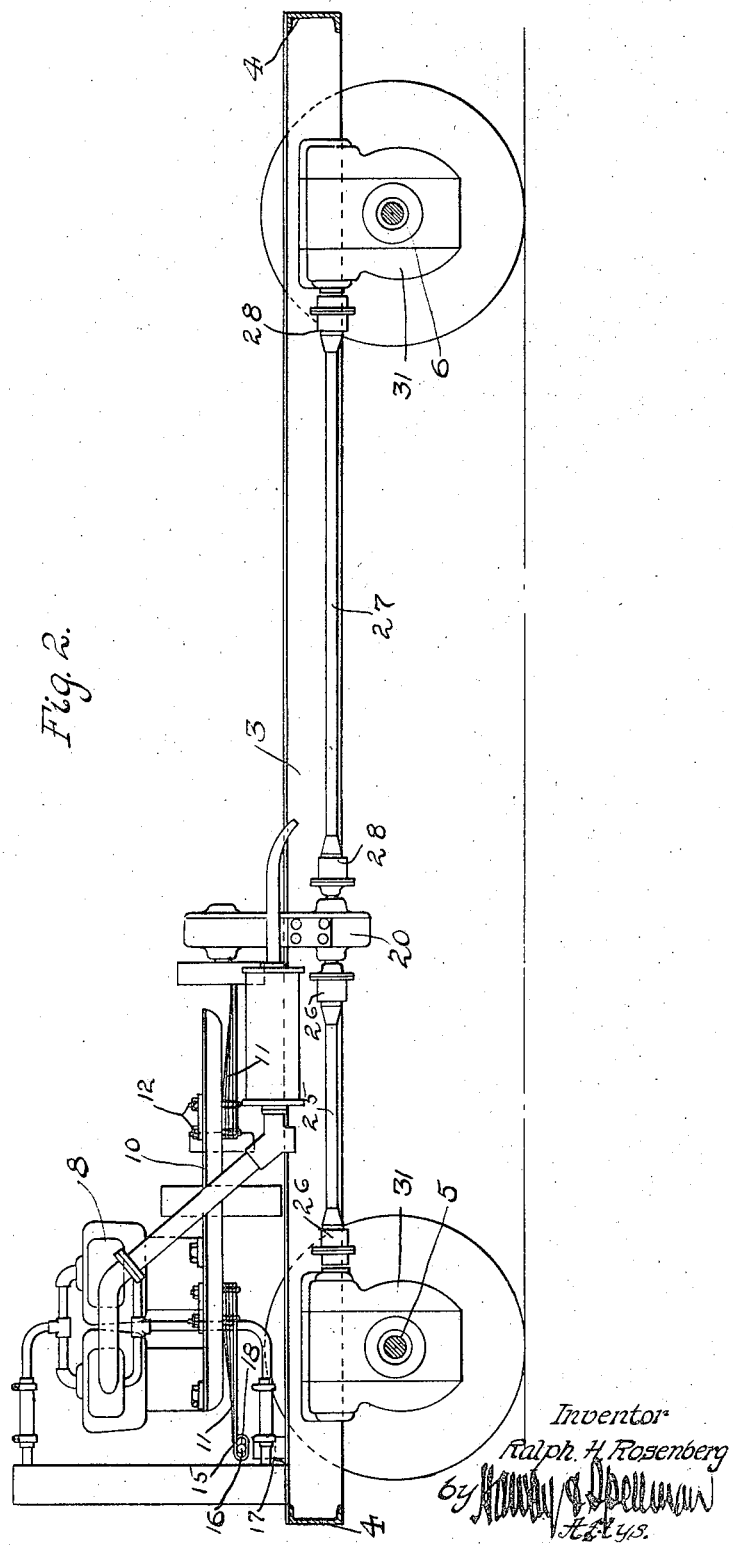

1,252,034.

Patented Jan. 1, 1918.
3 SHEETS—SHEET 3.

Witnesses
Robert S. McCeadie
Edward J. Wilson

Inventor
Ralph H. Rosenberg
by Harvey & Harvey
Attys.

UNITED STATES PATENT OFFICE.

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

DRIVING MECHANISM FOR AUTOMOBILES.

1,252,034.      Specification of Letters Patent.      Patented Jan. 1, 1918.

Application filed February 14, 1912, Serial No. 677,553. Renewed June 15, 1917. Serial No. 175,041.

*To all whom it may concern:*

Be it known that I, RALPH H. ROSENBERG, a citizen of the United States, and a resident of Columbus, county of Franklin, and State of Ohio, have invented certain new and useful Improvements in Driving Mechanisms for Automobiles, of which the following is a specification.

My invention relates to improvements in automobiles and has particular reference to improvements in the power or driving mechanism of automobiles.

The principal object of my invention is to provide improved means for mounting an engine for operating a driving mechanism for automobiles which shall protect the engine against road shocks and excessive transmission strains, and which shall be so associated with the main frame of the automobile that the power of the engine can be efficiently transmitted to an axle arranged beneath the engine.

The invention is embodied in the construction herein shown and described and then pointed out in the claim.

My invention will be more readily comprehended by reference to the accompanying drawings forming a part of this specification and in which:

Figure 1 is a top plan view of a chassis equipped with a driving mechanism embodying my invention;

Fig. 2 is a longitudinal section of the chassis on the line 2—2 of Fig. 1, and showing a side elevation of said mechanism;

Figure 4:
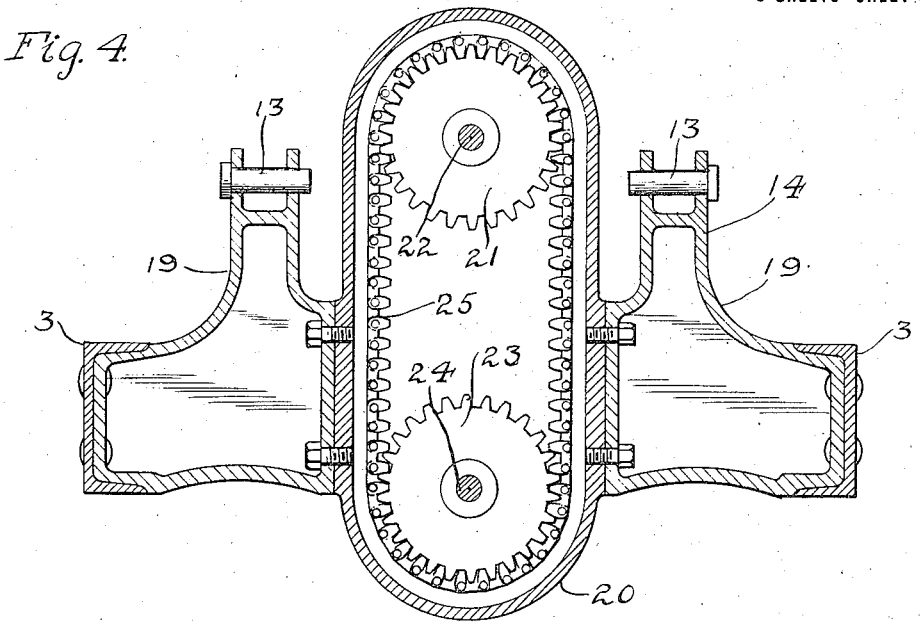
Fig. 4 is a vertical section on the line 4—4 of Fig. 3.
Figure 3:
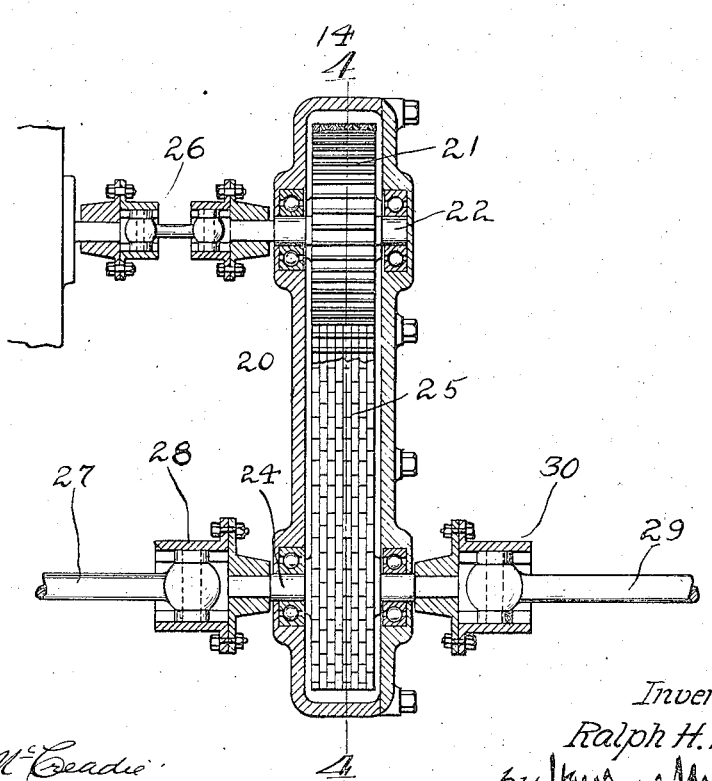
Fig. 3 is an enlarged, detail longitudinal section on the line 3—3 of Fig. 1.

The chassis illustrated in the drawings consists of a main frame 2 comprising side bars 3—3 and cross members 4—4, and is equipped with a forward driving axle 5 and a rear driving axle 6. These axles are suitably mounted upon load-bearing springs 7. In the chassis illustrated, the forward wheels are steering wheels and the rear wheels are non-steering, but it should be understood that my invention may be applied to chassis in which all four wheels are steering, without departing from the spirit of my invention.

The chassis is equipped with an engine 8 mounted upon the forward end thereof and substantially above the forward driving axle, and with a suitable speed changing device 9 arranged to the rear of the engine. The engine and the speed changing device are both mounted upon a sub-frame 10 which is arranged substantially parallel with the main frame and is connected thereto by means of springs 11. These springs are what may be termed "leaf springs" and are arranged two at the forward end and two at the rear end of the frame 10. They extend forwardly and rearwardly beyond the limits of the frame and their free ends are pivotally mounted upon suitable cross bars carried by the main frame, and they are clamped at their inner ends to the side bars by means of suitable clamping bolts 12. The rear ends of the rear springs 11 are pivotally mounted upon horizontal pins 13 carried in a cross bar 14 and the forward or free ends 15 of the forward springs 11 are pivotally mounted upon horizontal pins 16 carried by a cross bar 17. The free ends 15 of the forward springs are provided with elongated openings 18 receiving the pins 16 and these elongated openings permit a slight longitudinal movement of the forward ends of the springs when the springs are flexed by the up and down movement of the frame 10. The engine and the speed-changing mechanism together form what may be termed a unitary power plant resiliently supported upon the main frame of the automobile through the springs 11 and it is thereby free to respond to shocks or vibrations induced in the main frame of the automobile by travel over rough roads. In other words, the engine is arranged to float above the main frame, and, the axles being spring mounted, are arranged to float beneath the main frame. Each of the axles is provided with a suitable differential device 31 through which the power is transmitted to the axle and by means of which the wheels on opposite sides of the chassis are permitted to rotate relatively to each other to compensate for travel in turning corners.

The cross bar or member 14 is arranged at the rear end of the speed changing device or to the rear of the power unit and it is secured rigidly in place upon the side bars 3 of the main frame. This member 14 consists of brackets 19 secured at their outer ends to the frame and extending inwardly toward each other and receiving between their inner ends a transmission housing or bearing 20. Within this housing I arrange a suitable transmission mechanism for carrying the power of the engine downwardly from the level of the engine shaft to substantially the level of the forward and rear axles.

In the embodiment of my invention illustrated, this transmission mechanism consists of a chain wheel 21 suitably mounted on a horizontal shaft 22 in the upper part of the housing and a second chain wheel 23 similarly mounted in the lower part of the housing on a horizontal shaft 24 and a silent chain 25 of large power capacity trained over both of these chain wheels. The upper shaft 22 is in substantial alinement with the shaft of the engine and is connected thereto through the medium of the speed changing mechanism and a universal joint 26, whereby the power unit can move freely up and down without causing any undue strain or friction upon said shaft 22. The shafts 22 and 24 are held in rigid bearings carried by the housing 20 and are in a sense rigid with the main frame 2 of the automobile. The lower shaft 24 is connected to the differential mechanism of the forward axle by means of a horizontal shaft 27 which is provided at its ends with suitable universal joints 28. The shaft 24 is also connected to the differential mechanism of the rear axle by means of a second horizontal shaft 27 which is provided at its ends with suitable universal joints 30. It will now be seen that the axles 5 and 6 are free to move up and down in response to changes of load and road shocks without transmitting undue strains or friction upon the driving mechanism mounted in the rigid gear case 20.

It is to be noted that a further advantageous feature of my novel driving mechanism resides in the fact that when the speed of the engine is suddenly changed, due to shifting the speed changing mechanism or applying the brakes, the engine is free to resiliently rock upon its supporting springs and thereby decrease the metallic impact due to these sudden changes of speed.

As many modifications of my invention will readily suggest themselves to one skilled in the art, I do not limit or confine my invention to the specific structures herein shown and described.

I claim:

In a motor vehicle, the combination with a spring supported main frame and an axle driving shaft, of a spring supported sub-frame superposed on the main frame, a motor and a change speed gear supported on said sub-frame, a transmission gear rigidly supported on the main frame and connected with the axle driving shaft, and a flexible driving connection between said change speed gear and the transmission gear.

In testimony whereof, I have hereunto set my hand, this 26 day of January, 1912, in the presence of two subscribing witnesses.

RALPH H. ROSENBERG.

Witnesses:
ROBERT H. COCHRAN,
EDWARD H. McCLOUD.